Aug. 4, 1936.  B. SASSEN  2,050,127

TRACER CONTROLLED CAM CUTTING MACHINE

Filed July 28, 1934  4 Sheets-Sheet 2

Inventor
BERNARD SASSEN
By A. H. Parsons
Attorney

Fig. 8

Patented Aug. 4, 1936

2,050,127

UNITED STATES PATENT OFFICE 2,050,127

TRACER CONTROLLED CAM CUTTING MACHINE

Bernard Sassen, Cincinnati, Ohio, assignor to The Cincinnati Milling Machine Company, Cincinnati, Ohio, a corporation of Ohio Application July 28, 1934, Serial No. 737,467

26 Claims. (Cl. 90—13.7)

This invention relates to machine tools and more particularly to an automatic pattern controlled machine tool.

One of the objects of this invention is to provide a machine for automatically producing profile surfaces on the periphery of rotatable work pieces from a pattern or master.

Another object of this invention is to provide an automatic pattern controlled cam cutting machine.

A further object of this invention is to provide an automatic pattern controlled machine which is selectively adjustable to produce plate cams, face cams, or cylindrical cams.

An additional object of this invention is to provide an improved machine of the character described for forming grooves in the periphery of cylindrical cams from a plate cam master.

A still further object of this invention is to provide an improved fluid operating and control mechanism for automatic pattern controlled machine tools.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims, without departing from or exceeding the spirit of the invention.

Referring to the drawings in which like reference numerals indicate like or similar parts.

This invention is primarily intended for producing profiled control surfaces on rotatable members, which surfaces are adapted to act when the rotatable members are put to use for determining movements to be imparted to a control element during rotation of the member. Such rotatable members may be divided into three classes commonly known in the art as plate cams, face cams, and cylinder or barrel cams. The plate cams have the control surface formed directly on the periphery of the cam body; the face cams have the control surface formed on the face of the cam by cutting a groove therein; and the barrel cams which are in the form of a cylinder have the surface formed on the periphery of the cylinder by cutting a groove therein. In all cases, however, the surface is formed by effecting a relative rotary movement between the cutter and the cam blank which is simultaneous with a second relative movement between the cutter and cam blank which is either at right angles to or parallel to the axis of the cam blank depending upon its class or type.

From the foregoing, it will be seen that it is necessary to mount the cam blank for relative rotation with respect to a cutter. To this end the machine shown in Figure 1 comprises a bed 10 having horizontal guideways 11 for receiving and guiding a work table 12 for reciprocatory movement, the table in turn supporting a cam blank 13.

Figures 1, 3, 4, 5:
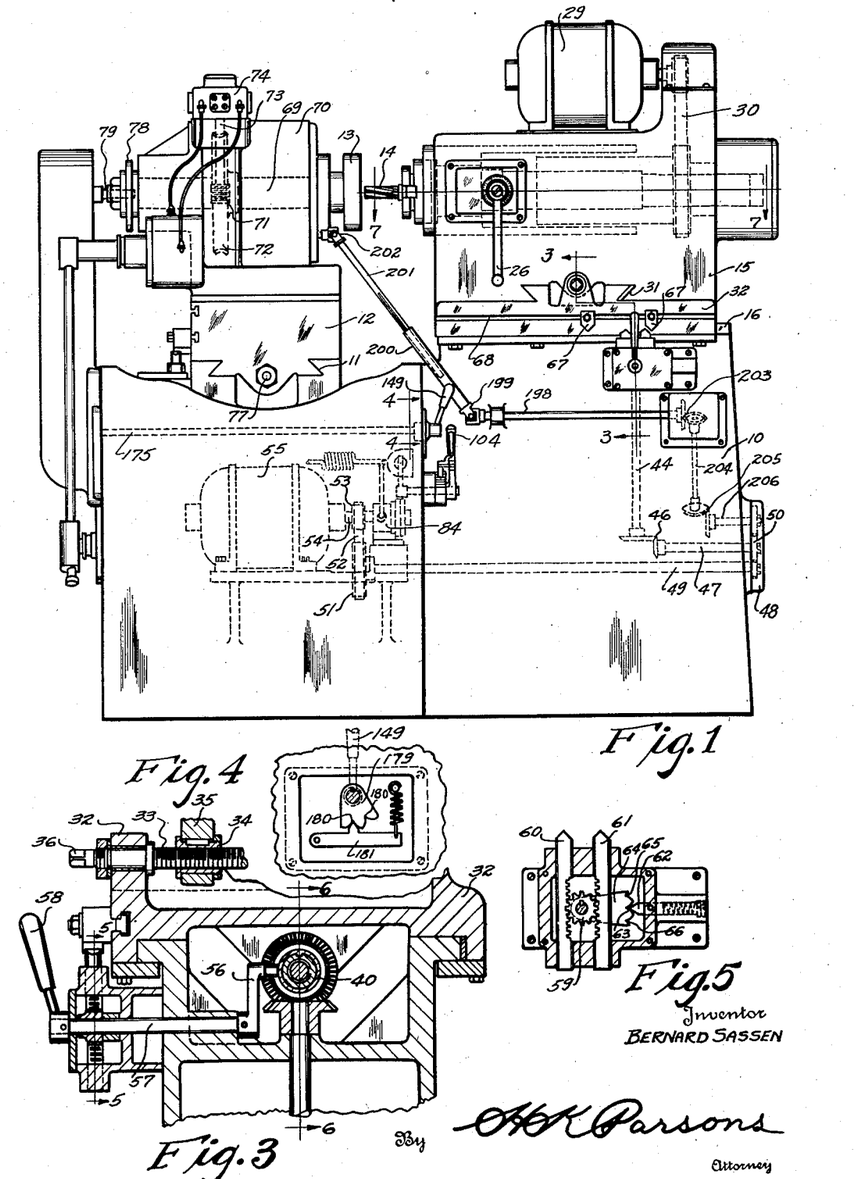
Figure 1 is an elevation of a machine embodying the principles of this invention.
Figure 3 is a section taken on the line 3—3 of Figure 1.
Figure 4 is a detailed section as viewed on the line 4—4 of Figure 1.
Figure 5 is a detailed section showing the trip plungers as viewed on the line 5—5 of Figure 3.

The cutter 14 is supported on a ram 15 which is reciprocably mounted on guideways 16 formed on the bed at right angles to the table guideways 11 whereby the cutter may be moved toward and from the work support 12.

Figures 6, 7:
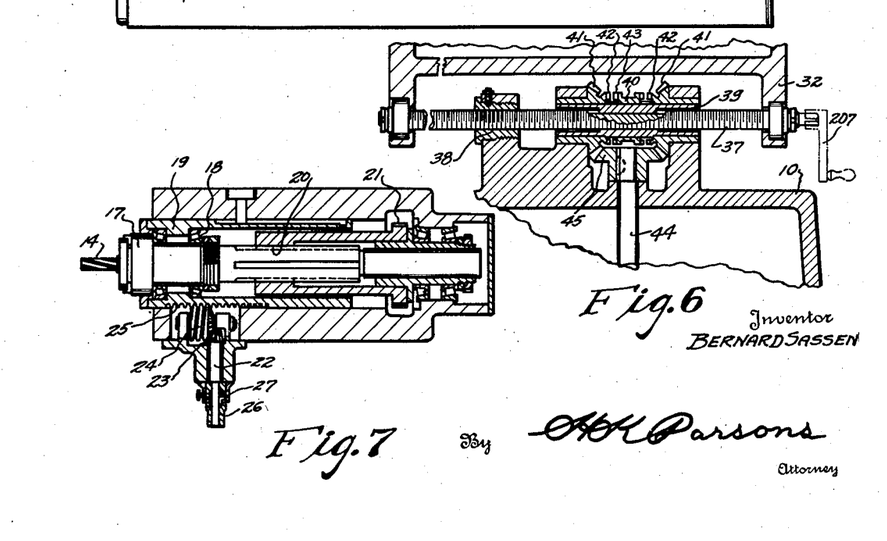
Figure 6 is a section through the ram reverser as viewed on the line 6—6 of Figure 3.
Figure 7 is a section showing the cutter spindle quill adjustment as viewed on the line 7—7 of Figure 1.

As shown in Figure 7, the cutter 14 is secured in the end of a spindle 17 which is mounted on anti-friction bearings 18 in the sleeve 19. The rear end of the spindle is splined at 20 in the elongated hub of gear 21. The spindle is fixed with the sleeve 19 for axial movement therewith and this movement is effected by conventional mechanism comprising the manually rotatable shaft 22 which is inter-connected by bevel gearing 23 to a spiral gear 24. The spiral gear intermeshes with rack teeth 25 formed on the periphery of the sleeve 19.

The shaft 22 may be rotated by the handle 26 which is adapted to be connected and disconnected from the shaft 22 by means of clutch teeth 27. A dial 28 is formed integral with the shaft 22 for indicating the amount of axial movement imparted to the quill and thereby to the cutter. This adjustment is useful for determining the depth of grooves when manufacturing face or cylindrical cams.

The gear 21 may be interconnected through suitable means to a prime mover 29 carried by the ram 15 and in the present instance this connection is in the form of a sprocket chain 30.

The slide 15 may also be mounted, if so desired, for providing lateral adjustment of the cutter 14 and to this end the slide may be mounted on guideways 31 formed on the top of a sub-base 32. The mechanism for effecting this adjustment may comprise a screw 33 which, as shown in Figure 3, is anchored against axial movement in the sub-support 32 and threaded in a nut 34 carried by a lug 35 which depends from the underside of slide 15. The end of the screw may be provided with a squared head 36 upon which may be detachably mounted a suitable manually operable control lever not shown.

The sub-support 32 may be power operated and to this end is provided with a lead screw 37 which, as shown in Figure 6, is anchored at both ends in the support 32. The screw passes through a nut 38 which is fixed with the bed 10 of the machine. The screw also has a splined connection with the rotatable sleeve 39 which in turn is splined to the clutch member 40. A pair of bevel gears 41 are mounted for free rotation on the sleeve 39 and provided with clutch teeth 42 on the opposing faces thereof for inter-engagement with similar clutch teeth 43 formed on opposite ends of the clutch member 40. A power shaft 44 is provided with a bevel gear 45 which intermeshes with bevel gears 41 for effecting rotation thereof in opposite directions. Thus by shifting the clutch member 40 into selective engagement with one or the other of the bevel gears the slide 32 may be moved toward or from the work table.

The shaft 44 is connected through bevel gearing 46 to shaft 47 which extends through the rear of the bed into a change gear box 48. A second shaft 49 has one end extending into the change gear box for inter-connection with shaft 47 through change gears 50 and the other end provided with a sprocket wheel 51 which is interconnected by a sprocket chain 52 to a sprocket pinion 53 fixed on the armature shaft 54 of the prime mover 55. It will now be seen that by use of the change gears, the cutter 14 may be moved at various rates toward and from the work support.

The clutch member 40 is provided with a shifter fork 56 as shown in Figure 3, which is secured to the end of an oscillatable shaft 57. This shaft has a manually operable handle 58 secured to the end thereof for effecting manual engagement of the clutch and also has a gear 59 keyed thereto for effecting automatic disengagement of the clutch. As shown in Figure 5 the gear 59 is operatively connected through rack teeth to a pair of trip plungers 60 and 61. When the clutch 40 is in a neutral position the plungers 60 and 61 are in the position shown in Figure 5. They are held in this position by a spring pressed plunger 62 engaging a central notch 63 formed on the detent plate 64 which plate is also keyed to the shaft 57. The plate has a pair of notches 65 and 66 formed on opposite sides of the central notch whereby upon rotation of the shaft in either direction from the position shown in Figure 5, one plunger will be elevated and the other depressed and the plunger 62 will hold the parts in either of these positions.

The plungers are adapted to be depressed by control dogs 67 which are mounted in a conventional manner in a T-slot 68 formed in the sub-base 32. When either dog depresses a plunger the power movement of the slide 32 is stopped. In other words, the movement of the slide is initiated by hand and automatically stopped by the trip dog. When the machine is used for forming cam grooves, the change gears in box 48 may be suitably chosen to provide a slow feed rate so that upon starting the machine the operator merely throws the lever 58 and the cutter will feed into the work to the proper depth without further attention on the part of the operator. If the nature of the work is such that the movement of slide 32 is merely a positioning movement, the change gears in box 48 may be chosen to impart a fast movement to the slide 32.

If the cam blank to be cut is a plate cam, which means that the cutter operates directly on the periphery of the blank, then the same may be mounted directly on the end of shaft 69 which is journaled in the work head 70 which in turn is carried by the slide 12. This shaft may be rotated by means of a worm 71 intermeshing with a worm gear 72 fixed with the shaft 69. In the present instance, the worm is secured to the end of a vertical shaft 73 which is the output shaft of a prime mover 74 which is in the form of a rotary hydraulic motor.

The slide 12 is adapted to be reciprocated by a second fluid operable motor which is in the form of a cylinder 75 having a contained piston 76, the piston being connected by piston rod 77 to the slide 12. It will now be seen that by controlling the flow of fluid to the hydraulic motor 75 and to the hydraulic motor 74 that a simultaneous rotary and reciprocatory movement may be imparted to the cam blank 13 relative to the cutter 14. If these two movements are properly controlled, any desired profile may be produced on the periphery of the cam. In the present instance, these two movements are controlled by mechanism which is governed by a tracer contacting a pattern or master. To insure the greatest accuracy of reproduction, the pattern 78 is secured directly to the opposite end of shaft 69 for engagement with the tracer finger 79 as more particularly shown in Figures 1 and 2. The tracer finger is mounted in one end of a pivoted tracer arm 80 which has a second arm 81 integral therewith but at right angles thereto for controlling the position of a plunger 82 in a distributor valve 83. This valve determines the flow of fluid from a pressure source to the two hydraulic motors previously referred to in such a way as to control their respective rates of operation and thereby faithful reproduction of the pattern in the work.

Figure 8:
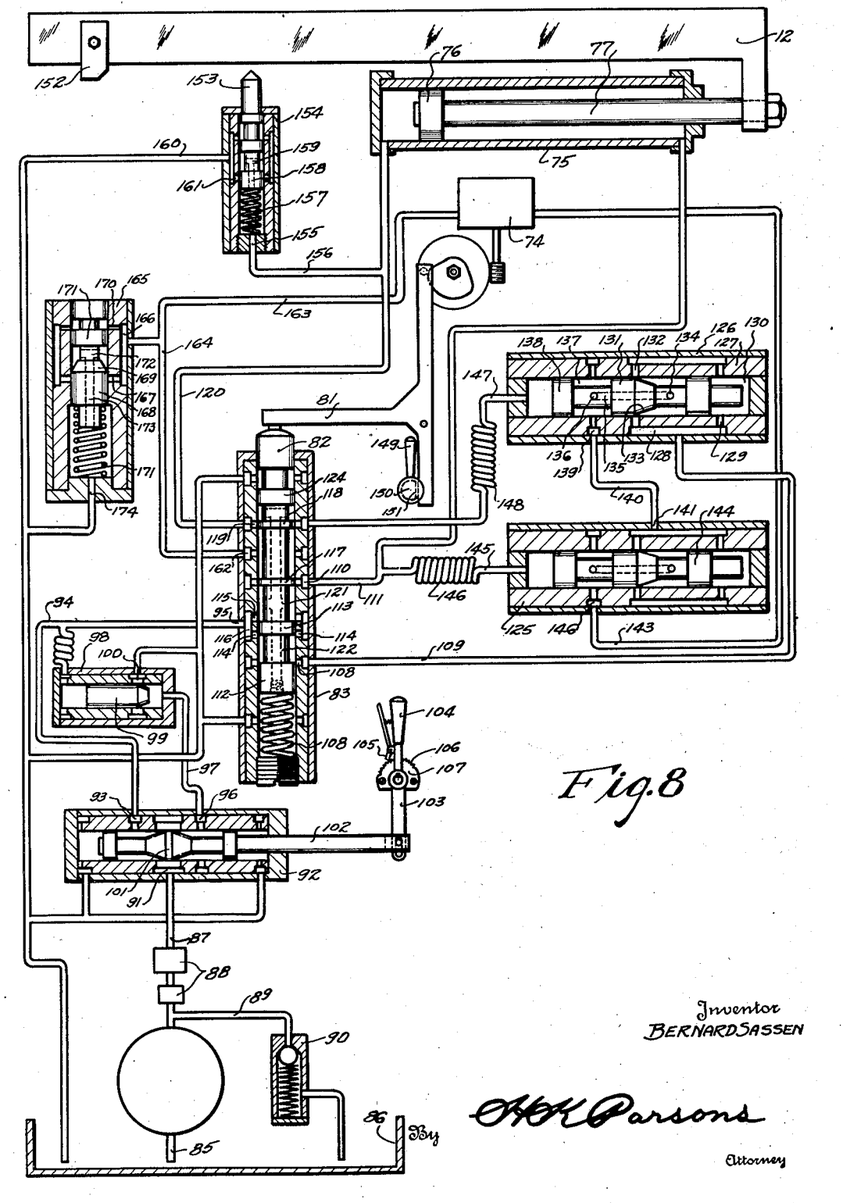
Figure 8 is a semi-diagrammatic view of the fluid operating and control mechanism of the machine.

The source of pressure may be any well-known form of fluid pump, such as 84, which is directly connected for rotation by the prime mover 55, as shown in Figure 1. This pump may have an intake 85 as shown in Figure 8, for withdrawing fluid from a suitably positioned reservoir 86 and delivering same under pressure to channel 87. This channel may include suitable filtering devices 88 for removing foreign particles from the fluid, thereby insuring accuracy of operation of the various control valves. This channel may also have a branch 89 to which is connected an emergency relief valve 90.

The channel 87 is connected to port 91 of a rate control valve 92 which may not only be used for determining the rate of operation of the machine, but also may be utilized as a start and stop valve. The valve 92 also has a port 93 which is connected by channel 94 to port 95 of the distributor valve 83. This channel serves as the main supply channel for operation of the machine. The valve 92 has a third port 96 which is connected by channel 97 to one end of a balancing valve 98. This balancing valve has a plunger 99 one end of which is subjected to the pressure in channel 97 and the other end subjected to the pressure in channel 94. As the plunger 99 is moved through the pressure differential in these lines it varies the quantity of flow through the port 100 and thereby re-equalizes the pressure in the two channels. The balancing valve plunger serves to maintain the division of flow effected by the double tapered spool 101 formed on the valve plunger 102 which divides the incoming flow through port 91 among ports 93 and 96. It will be noted that the port 100 of the balancing valve is connected to reservoir and thus the valve plunger 102 serves to by-pass variable quantities of fluid to reservoir and thereby increase or decrease the rate of operation of the machine. Should the plunger 102 be moved to the left as viewed in Figure 8, a sufficient amount to close off all flow to port 93, all the fluid will be by-passed to reservoir and the machine will stop.

The plunger 102 may be shifted by a pivoted lever 103 having an operating handle 104 to which is attached a spring pressed pawl 105 co-operating with indents 106 on the periphery of a fixed plate 107 for holding the valve plunger in any of its various positions.

The distributor valve 83 serves to divide the incoming flow to port 95 among the two fluid operated motors and in such a way that the motor that effects rotation of the pattern and cam blank is continuously running except when engaging radial surfaces, and the motor that effects reciprocation of the work table is operated more or less intermittently depending on the shape of the master contour. To this end the valve plunger 82 has a normal operating position in which it is held by the tracer, and in which it will be held so long as the radius of any arcuate portion of the pattern remains the same. It is held in this position by a spring 108 which acts in a direction to maintain the valve plunger 82 in contact with arm 81, movement of this arm being limited by the tracer finger 79 engaging the periphery of the pattern.

The valve 83 has a port 108 to which is connected supply line 109 for the rotary motor 74. Valve 83 has another port 110 to which is connected the supply line 111 for the reciprocating motor 75. The plunger 82 has a spool 112 which is reciprocable relative to the port 108 and when the plunger is in the position shown, this port is half-way open. The plunger 82 has a second spool 113 which is movable relative to a first set of radial holes 114 which lie in one plane, and a second set of radial holes 115 which lie in a second plane, but both sets of radial holes being connected to the annular groove 116 which is opposite port 95. When the spool 113 is in the position shown, the radial holes 114 are half way open so that the maximum flow now occurs between port 95 and channel 109.

At this time a spool 117 on plunger 82 is in a position to exactly close port 110 and thereby prevent all flow to channel 111. If now the contour of the pattern should change so that the plunger 82 moves upward as viewed in Figure 8, the port 108 will gradually be closed by spool 112 and port 110 will gradually be opened by spool 117 and the rate of rotation of the rotary motor 74 will decrease and the piston 76 and cylinder 75 will begin to move.

On the other hand, if plunger 82 should be moved downward, the spool 113 will gradually close the radial holes 114 thereby decreasing the supply to channel 109 and another spool 118 on plunger 82 will uncover a port 119 to which is connected a channel 120 which supplies fluid to the left end of cylinder 75. The fluid to this line will flow through the radial holes 115 to the annular space between spools 113 and 117 and then through a cross bore 121 formed in plunger 82 which intersects an axial bore 122, the axial bore terminating in a second cross bore 123 which communicates with the space between spool 118 and spool 124. This space will be connected at this time to port 119 so that the rotary motor 74 will slow down and the table will start to move in an opposite direction. It will thus be seen that the tracer finger 79 while in contact with the pattern governs the rotary and reciprocatory movement of the pattern and work relative to the tracer and cutter respectively.

In order to insure that the division of flow by valve 83 is maintained, a balancing valve 125 is connected between lines 109 and 111 and a second balancing valve 126 is connected between lines 109 and supply line 120.

The balancing valve 126 comprises a sleeve 127 in which is formed a wide annular groove 128, one end of the groove having radial holes 129 formed therein which communicate with the right hand end of bore 130 containing the valve plunger 131 whereby the pressure in channel 109 will act to shift plunger 131 toward the left. The fluid in groove 128 also flows through a second series of radial holes 132 lying in a plane, and opposite which reciprocates the tapered spool 133 formed in the valve plunger. This spool controls the flow through port 132 and thereby varies the pressure on the right hand end of the plunger. The fluid continues to flow through a cross bore 134 formed in the plunger, into an axial bore 135 and escapes through a second cross bore 136 into an annular groove 137 formed in the plunger between spool 133 and spool 138. The space between these spools is connected by port 139 and channel 140 to port 141 of balancing valve 125. This valve is of the same construction as the previous valve, and the description thereof need not be repeated. This valve has an exhaust port 142 which is connected by channel 143 to rotary motor 74. Pressure is communicated, however, to the left end of plunger 144 in valve 25 to shift the same to the left.

The left end of plunger 144 is connected for subjection to the pressure in line 111 by channel 145 in which is formed a small fluid resistance coil 146 to act as a dampening means to prevent continuous oscillation of plunger 144.

The left end of plunger 131 is connected for subjection to the pressure in channel 120 by a channel 147 which also has a dampening coil 148 therein. It will now be seen that the tracer is adapted to completely control the movement of the work with respect to the pattern, and that the division of flow effected by valve 83 is accurately maintained by the balancing valves 125 and 126.

Figure 2:
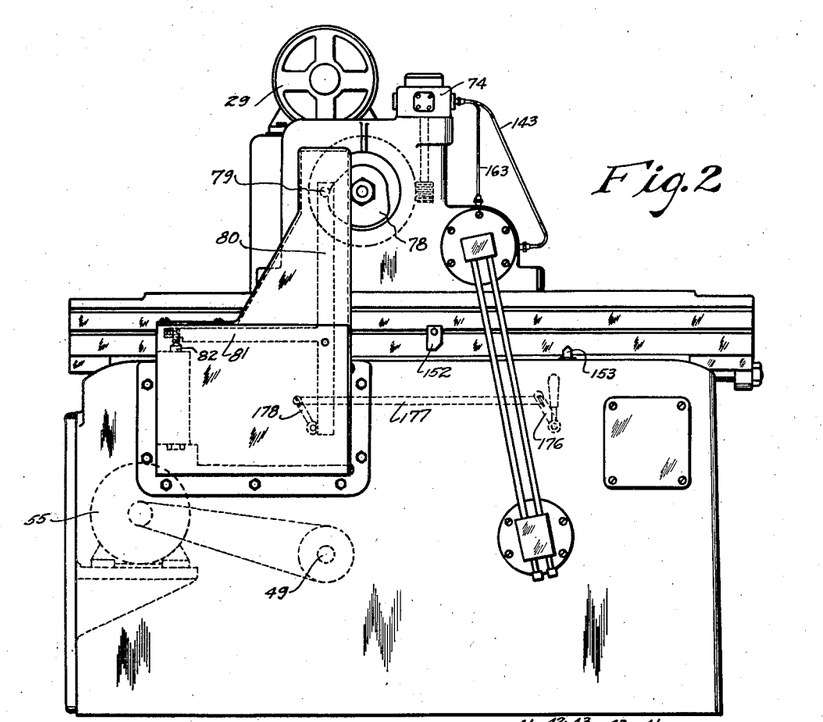
Figure 2 is an elevation of the machine as viewed from the left of Figure 1.

When cutting plate cams, the cutter is positioned so as to engage the periphery of the cam blank as the work table moves toward the left in Figure 2 to bring the pattern 78 into contact with the tracer finger 79 so that all the operator has to do is to move the throttle valve 102 toward the right to initiate flow in channel 94 and the distributor valve plunger 82 will at this time be held in an upward position by spring 108 and in such an extreme position that all flow to channel 109 will be cut off and the entire flow from channel 94 diverted to channel 111. This movement will continue until the pattern engages the tracer finger and moves the plunger 82 downward to more or less of a central position, depending on the profile of the master.

At the completion of the profiling operation, the tracer arm 82 is manually deflected by means of an operating handle 149 which is operatively connected to a rotatable cam member 150. This cam member has a flat side 151 which, during operation of the machine, is positioned parallel to the arm 80 to provide sufficient clearance to permit free operation of the arm 80 by the pattern. When the cam 150 is rotated, however, by the handle 149, the arm 80 is pivoted in such a manner as to depress plunger 82 to such an extreme position that all flow is disconnected from channel 109 and the entire input is delivered into channel 120 through the connections previously described to cause retraction of the table 12. This will withdraw the master and cam blank out of engagement with the tracer and cutter respectively. If the cam 150 is held in this position, the retracting movement will continue until a trip dog 152 depresses the by-pass valve plunger 153. This plunger is reciprocably mounted in the valve body 154 which has a port 155 at the lower end thereof connected to the supply channel 120 through the branch line 156. The valve plunger 153 is normally held in an upward position by a spring 157 so that the fluid entering through port 155 and flowing through the axial bore 158 and cross bore 159 formed in the plunger 153 will be prevented from escaping into the return line 160. Upon depression of the plunger 153, however, by dog 152 the cross bore 159 will be connected to port 161 and thereby to the return channel 160, thus immediately lowering the pressure in cylinder 77 and stopping movement thereof. This serves as an automatic stop mechanism and the position of the dog 152 will determine the amount of retraction of the table 12.

The valve 83 has another port 162 which is an exhaust port and which is so arranged relative to ports 110 and 119 that whenever one of these ports is connected to pressure the other port is connected to the return channel because it is obvious that when pressure is admitted to one end of cylinder 75, means must be provided to permit escape of fluid from the other end in order that the slide 12 may move.

The rotary motor 74 has a return line 163 and this line along with the return line 164 from port 162 are connected to a back pressure relief valve 165 having a wide annular groove 166 therein to which these channels are connected. A plurality of radial bores 167 formed in a plane at one end of this annular groove are opened and closed by spool 168 having a tapered end 169. A second series of radial holes 170 which lie in a plane at the opposite end of groove 166, serve to admit fluid to the upper end of the valve and move the valve plunger downward against the resistance of spring 171. As the back pressure rises, the plunger moves downward and opens the ports 167, permitting escape of fluid through the cross and radial bores 172 and 173 respectively formed in the valve plunger, fluid escaping through an exhaust port 174 formed in one end of the valve body. The spring 171 may be so chosen as to maintain a predetermined back pressure at all times in the return channels to prevent undue acceleration thereof.

It will be noted from Figure 1 of the drawings that the various control levers 58, 104 and 149 are more or less nested so that the operator can completely control operation of the machine from a single position, while at the same time observing the action of the cutter on the work. The lever 149 is actually connected to the cam 150 through the following mechanism. A rod 175 extends crosswise of the table supporting portion of the bed, and has the handle 149 integrally secured to one end and a crank 176 secured to the other end, as shown in Figure 2, the crank being connected by a link 177 to a second crank 178 integral with the rotatable cam. If so desired, a detent may be associated with the handle 149 to hold it in either one of two positions and as shown in Figure 4 may comprise a plate 179 having a pair of indents 180 which may be selectively engaged by the spring pressed detent 181.

Figures 9, 10, 11, 12, 13:
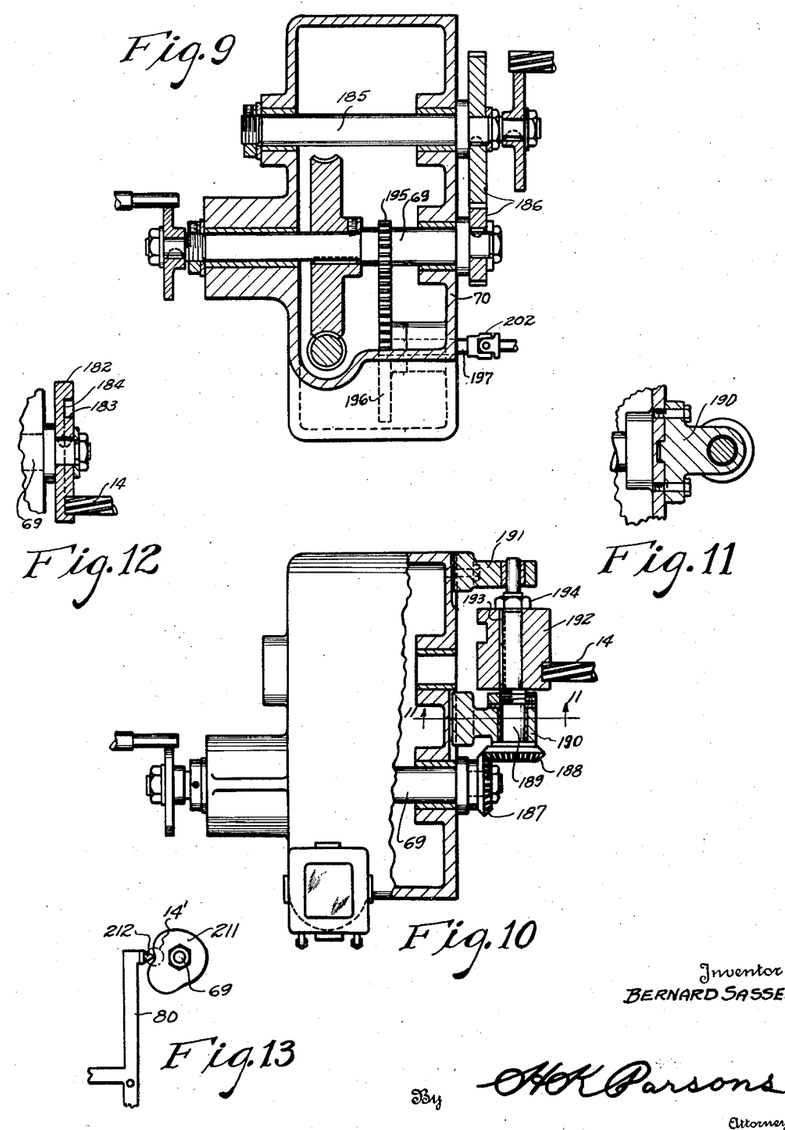
Figure 9 is a sectional view through the work head showing the mechanism for producing enlargements or reductions of the master.
Figure 10 is a section similar to Figure 9 showing the set-up for producing grooves in cylindrical cams.
Figure 11 is a detailed section on the line 11—11 of Figure 10.
Figure 12 is a detailed view showing the arrangement of the cutter and work for producing face cams.
Figure 13 is a view showing a modified form of tracer point.

When manufacturing face cams, the blank such as 182 is secured directly to the end of shaft 69 as shown in Figure 12 and in this case the cutter 14 is fed inward to the desired depth before rotation of the blank commences. The master in this case would have a contour preferably corresponding to the contour which will be produced by the inner wall 183 of the cam groove 184.

It is also possible with this machine to provide plate cams of a proportionately larger or smaller size than the pattern, by use of a construction such as that shown in Figure 9. An auxiliary shaft 185 is journaled in the work head and connected by change gears 186 to shaft 69 so that the shaft 185 will rotate at a faster or slower rate than shaft 69. This means that if the plate cam has two portions, one of which is a repetition of the other, that the master may be so formed as to produce one portion and the blank rotated one-half the rate of the master so that two rotations of the master would be equivalent to one rotation of the blank, then each half of the blank will have the same contour.

The construction shown in Figure 12 is utilized for forming barrel cams, and in this instance the shaft 69 is provided with a bevel gear 187 which intermeshes with a bevel gear 188 secured to the end of a detachable work holding shaft 189. Shaft 189 may be journaled at one end in a detachable bracket 190 and at the other end in a detachable bracket 191. The bracket 191 is removed while the blank 192 is secured to the shaft 89 by means of a key 193 and a locking nut 194.

The cutter 14 in this construction must of course be fed to depth by the sub-support 32 and laterally positioned by means of the adjusting screw 33. In this construction, the cylindrical cam blank 192 is moved axially relative to the cutter 14 and this movement may be controlled by a plate cam master, as in the previous constructions.

When cutting face and barrel cams it may be desirable to gradually feed the cutter into the work during rotation thereof, rather than feeding the cutter to the full depth of the groove before rotation of the work is started. In such a case, the cutter is axially positioned so as to just touch the work and then an automatic feeding mechanism is utilized to effect the infeed. This mechanism is so constructed that a predetermined amount of infeed is effected for each rotation of the work. One form which this mechanism might take will now be described.

A small pinion 195 may be secured to shaft 69, as shown in Figure 9, in mesh with a large gear 196 secured to the end of a shaft 197 which is journaled in the housing 70. A shaft 198, Figure 1, is journaled on the bed and interconnected by means of universal joint 199, telescoping shafts 200 and 201, and universal joint 202, to the shaft 197 so that upon rotation of shaft 197 the shaft 198 will be rotated in spite of longitudinal movements of the table 12. The shaft 198 is interconnected through bevel gearing 203 to an inclined shaft 204 which in turn is interconnected by bevel gearing 205 to shaft 206. This latter shaft is journaled in the bed parallel to shafts 47 and 49 and has one extremity extending into the change gear box 48. When it is desired to utilize this infeeding mechanism the change gear which is attached to shaft 49 may be removed therefrom and mounted on shaft 206. This operates to disconnect the prime mover 55 from shaft 47 and interconnect this shaft with the rotary hydraulic motor 74 which will then serve as the power means for gradually moving the slide 15 through the previously described mechanism.

The dogs 67 on slide 15 may be utilized as before to terminate the infeeding movement. Retraction of the slide may be effected by a hand crank 207 which may be detachably mounted on the end of screw 37, Figure 6.

Attention is invited to the fact that there are two different methods for forming peripheral cams, one of which is to utilize a master which is previously shaped to the exact size desired so that the blank after cutting is an exact duplicate of the master. When using such a master, the tracer and cutter are the same diameter as the roller which is used with the cam, and it will be noted that this is the method which was previously described in connection with the forming of peripheral cams because the tracer finger 79 is the same diameter as the cutter 14 and this diameter should be the same diameter as the follower roller. In originating such a master, a greater amount of work is involved on the part of the designer because interferences of the roller must be taken care of; and further the accuracy of such a master cannot be checked by means of an indicator because of the various compensations which might be introduced into the profile to obtain proper movements of the follower.

By means of the present construction a simpler method can be utilized for producing cams which reduces the work of the designer by transferring part of this work for performance by the machine. In other words, the first step in laying out a cam is to determine first the path of movement of the center of the follower roller. This is accomplished by determining the radial distance of the center of the roller with respect to the center of the cam for each angular position of the cam, or in other words the shape of the path of the center of the follower roller. Having done this, the next step is to determine the shape of the peripheral surface of the cam so that it will act on the roller to maintain its center always in said path. This means that the shape of the periphery of the cam is not necessarily of the same shape as said path, even although smaller.

By means of the present machine a master may be utilized, the shape of which is the shape of said path, the subsequent compensations being automatically taken care of in the machine. To this end the master 211 having a profile in accordance with the path of the center of the follower roller is attached to the shaft 69, as shown in Figure 13, and the tracer arm 89 is provided with a knife edged follower 212. The knife edge of this follower lies in the same horizontal plane with the center of shaft 69 and therefore the distance from the center of the shaft to the point of contact between the knife edge and the periphery of the cam will correspond to the radius or throw of the center of the follower roller, and if this distance was measured by substituting an indicator for the follower, a check could be made on the accuracy of the master.

If a cutter 14' is selected having a diameter equal to the diameter of the follower roller and the work and master rotated, the center of the cutter will always be maintained the proper radial distance from the center of the work which is the ultimate desired result, and the profile of the cam will be so formed as to maintain this relationship regardless of whether the shape formed on the cam blank is the same as the shape of the master 211. In other words, this set-up insures that the center of the follower roller is always at the proper radial distance from the center of the cam and then the actual shape of the cam profile is automatically taken care of by the machine.

It will be noted that no error is introduced resulting from pivotally mounting the cutter support or the work support as in prior constructions because no pivotal supports are used. The tracer and the cutter might almost be considered as fixed points and the work and pattern reciprocate toward and from these fixed points in a straight path as distinguished from a curvilinear path generally utilized in prior constructions. Since the movement is in a straight path the distance between the point of contact between the tracer and master and the center of the shaft 69 is always the true radial distance that the center of the follower roller should be from the center of its controlling cam. Thus by means of this construction a cam may be automatically reproduced from a master which has a profile shape in accordance with the path of movement of the center of the follower roller rather than the periphery thereof.

Although the cutter 14 has been illustrated to explain the invention, it is apparent to those skilled in the art that a small grinding wheel could be substituted for the cutter for finishing purposes, if so desired, without departing from the principles of the invention.

There has thus been provided an improved automatic pattern controlled machine tool which is suitable for producing various types of cams from a master in an automatic manner so that relatively unskilled labor may be utilized to operate the machine in a satisfactory manner.

What is claimed is:

1. In a pattern controlled machine tool having a tracer and a cutter, the combination of means for supporting a pattern and a work piece for rotary and bodily movements relative to the tracer and cutter respectively, a first power operable means for effecting one of said movements, a second power operable means for effecting the other of said movements, a common source of power for said means, and control mechanism governed by the tracer for determining operation of each of said means by said source.

2. In a pattern controlled machine tool having a tracer and a cutter, the combination of a first support, power operable means to reciprocate said support, a rotatable support carried by the first support, power operable means to rotate the second named support, means to secure a pattern and a work piece to said rotatable support, a source of power, and means controlled by the tracer for determining application of power to each of said power operable means.

3. In a pattern controlled machine tool having a tracer and a cutter, the combination of means to support a work piece and a pattern for rotary and bodily movement, separate fluid operable means for effecting said rotary and said bodily movements, a source of fluid pressure, and valve means controlled by the tracer for dividing fluid among said means to cause movement of the work relative to the cutter in accordance with movement of the pattern relative to the tracer.

4. In a pattern controlled machine tool having a tracer, the combination of a reciprocable slide, a rotatable arbor journaled on the slide, means to operatively connect a work blank for rotation by the arbor, means to operatively connect a pattern for rotation by the arbor, a power operable motor for rotating said arbor, power operable means for reciprocating said slide, and means controlled by the tracer for determining operation of each of said power operable devices.

5. In a cam cutting machine, a reciprocable support, a rotatable arbor carried by the support, means to attach a cam blank to one end of the arbor, means to attach a cam pattern to the other end of the arbor, a motor carried by the support for rotating the arbor, a second motor for reciprocating the support, a source of power for said motors, a tracer mounted for engagement with the pattern, a cutter mounted for engagement with the work, and means controlled by the tracer for determining the ratio of power operation of said motors and thereby the resultant direction of movement of the pattern and work with respect to the tracer and cutter.

6. In a cam cutting machine the combination of a reciprocable support, a power driven shaft journaled thereon, means to secure a pattern and a work blank to said shaft for rotation therewith, power operable means for rotating said shaft and reciprocating said support, a tracer engageable with the pattern, and power means governed by the tracer for determining the resultant movement effected by the shaft and the support and thereby the direction of movement of the work blank with respect to a cutter.

7. A cam cutting machine having a bed, a slide reciprocably mounted upon the bed, means on the slide for supporting a cam pattern and a cam blank for rotary movement, a fluid operable motor for effecting said movement, a second fluid operable motor for reciprocating said slide, a source of fluid pressure, a distributor valve for coupling the pressure to said motors, a tracer and a cutter carried by the bed for engagement with the pattern and blank respectively, means in the valve positionable by the tracer to selectively connect the source of pressure for individual operation of the rotary motor; or simultaneous operation of both of said motors whereby the blank will be cut in conformity to the pattern.

8. A machine for milling grooves in cam bodies automatically from a pattern comprising means to support the cam body and the pattern for rotation and reciprocation, a rotatable cutter, power operable means for advancing the cutter to the cam body, manual means for feeding the cutter into the cam body to determine the depth of groove, a tracer engageable with the pattern, and mechanism governed by the tracer for determining the ratio between the rate of rotation and the rate of reciprocation of the cam body whereby the groove will be cut in accordance with the pattern.

9. A machine for automatically milling grooves in cam bodies from a pattern comprising means to support the cam body and the pattern for rotation and reciprocation, a rotatable cutter, power operable means for advancing the cutter toward the cam body, manual means for feeding the cutter into the cam body to determine the depth of groove, a tracer engageable with the pattern, mechanism governed by the tracer for determining the ratio between the rate of rotation and the rate of reciprocation of the cam body whereby the groove will be cut in accordance with the pattern, and means to reverse said power operable means to effect retraction of the cutter from the cam body.

10. In a pattern controlled machine tool the combination of means to support a master cam for rotation, means to operatively connect a cam blank for simultaneous rotation with the master, a tracer and a cutter, power operable means to effect said rotation, and additional power operable means under control of the tracer to maintain the periphery of the master in contact with the tracer during said rotation whereby the blank will be moved in a similar manner relative to the cutter.

11. In a pattern controlled machine tool the combination of a reciprocable slide, rotatable means mounted on the slide for supporting a master and a blank, fluid operable motors for effecting rotation of said means and reciprocation of the slide, a distributor valve, a source of fluid pressure, a throttle valve for coupling the source of pressure to the distributor valve, a tracer, means operable by the tracer upon engagement with the master to move the distributor valve to a position whereby all flow from said source will be delivered to the motor causing rotation, said means also being responsive to over-deflection or under-deflection of the tracer to move the valve to a position to reduce the flow to said rotary motor and divert part of the flow to the slide motor.

12. In a pattern controlled machine tool the combination of a reciprocable slide, fluid rotatable means on the slide for supporting a master and a blank, fluid operable means for reciprocating said slide, a distributor valve, a source of fluid pressure, a throttle valve for determining the rate of flow from said source to said distributor valve and thereby the rate of operation of the machine, a tracer, means operable by the tracer upon engagement with the master to position the distributor valve for causing all flow from said source to be delivered to said fluid rotatable means, said means also being responsive to over-deflection or under-deflection of the tracer to reposition the distributor valve for diverting part or all of said flow to said fluid operable means, and manually operable means effective on said distributor valve for causing retraction of the pattern and work from the tracer and cutter respectively.

13. In a pattern controlled machine tool the combination of a reciprocable slide, fluid rotatable means on the slide for supporting a master and a blank, fluid operable means for reciprocating said slide, a distributor valve, a source of fluid pressure, a throttle valve for determining the rate of flow from said source to said distributor valve and thereby the rate of operation of the machine, a tracer, means operable by the tracer upon engagement with the master to position the distributor valve for causing all flow from said source to be delivered to said fluid rotatable means, said means also being responsive to over-deflection or under-deflection of the tracer to reposition the distributor valve for diverting part or all of said flow to said fluid operable means, manually operable means effective on said distributor valve for causing retraction of the pattern and work from the tracer and cutter respectively, and automatic trip operable means for stopping said retractive movement.

14. In a pattern controlled machine tool the combination of a reciprocable slide, fluid rotatable means on the slide for supporting a master and a blank, fluid operable means for reciprocating said slide, a distributor valve, a source of fluid pressure, a throttle valve for determining the rate of flow from said source to said distributor valve and thereby the rate of operation of the machine, a tracer, means operable by the tracer upon engagement with the master to position the distributor valve for causing all flow from said source to be delivered to said fluid rotatable means, said means also being responsive to over-deflection or under-deflection of the tracer to reposition the distributor valve for diverting part or all of said flow to said fluid operable means, manually operable means effective on said distributor valve for causing retraction of the pattern and work from the tracer and cutter respectively, automatic trip operable means for stopping said retractive movement, said last named means including a by-pass valve having a spring closed plunger, and a trip dog carried by the table for depressing said plunger to an open position.

15. In a pattern controlled machine tool having a fixed support, the combination of a cutter, and a tracer mounted on said support in axial alignment, a slide mounted on the support for movement between the cutter and tracer, means to support a pattern and a work piece for rotation on the slide, means to move the slide to engage the pattern and the work respectively with the tracer and cutter, power operable mechanism governed by the tracer for determining the subsequent path of relative movement between the cutter and work, and means to adjust the cutter out of alignment with the tracer whereby a predetermined amount of finishing stock will be left on the work.

16. In a pattern controlled machine tool having a fixed support, the combination of a cutter and a tracer mounted on said support in axial alignment, a slide mounted on the support for movement between the cutter and tracer, means to support a pattern and a work piece for rotation on the slide, means to move the slide to engage the pattern and the work respectively with the tracer and cutter, power operable mechanism governed by the tracer for determining the subsequent path of relative movement between the cutter and work, and means to adjust the cutter out of axial alignment with the tracer for roughing operations and into alignment with the tracer for finishing operations.

17. A machine for cutting grooves in barrel cams from a plate cam master comprising a reciprocable slide for supporting a barrel cam and a master, means on the slide for interconnecting the cam and master for simultaneous rotation, a fluid operable motor for effecting said rotation, a cutter spindle having a cutter thereon with its axis at right angles to the axis of the cam, a tracer engageable with the master, and power operable means controlled by the tracer for determining axial and rotative movement of the cam relative to the cutter.

18. A pattern controlled machine tool having a support, a table reciprocably mounted on said support, means uprising from the support on opposite sides of the table for supporting a cutter and a tracer respectively, means to support a pattern and a work piece on the table for engagement with the tracer and cutter respectively, power operable means carried by the table for rotating the pattern and work piece, and fluid operable means for reciprocating the table to maintain the pattern and work in contact with the tracer and cutter during said rotation.

19. In a pattern controlled machine tool having a bed, a work slide mounted on the bed, a tracer and cutter mounted on the bed and on opposite sides of the work table, means to support a pattern and a work piece on the table, means to adjust the table to engage the pattern with the tracer, and fluid operable mechanism governed by the tracer for determining the subsequent path of relative movement between the cutter and work.

20. In a pattern controlled machine tool having a tracer and a cutter, means to support a pattern and a work piece, a rotary motor, motion transmitting means operatively connecting the pattern and work piece for rotation about their respective axes, power operable means for effecting a relative reciprocatory movement between the tracer and pattern and between the cutter and work and in a direction which is radially as respects said axes, and means controlled by the tracer for determining the rate of said rotary movement as respects the rate of said reciprocatory movement.

21. In a pattern controlled machine tool having a tracer and cutter, means to support a pattern and a work piece for rotation about their respective axes, worm and worm gear means for effecting said rotation, a fluid operable piston for effecting relative movement between the tracer and pattern and between the cutter and work in a radial path with respect to said axes, a source of fluid pressure, fluid operable means for actuating said worm and worm gear means, and means controlled by the tracer for determining the directional effect of said pressure on said piston while causing uni-directional operation of said fluid operable means.

22. In a pattern controlled machine tool having a bed, a table reciprocably mounted upon the bed, means uprising from the bed at opposite sides of the table for supporting a tracer and a cutter in axial alignment, means to support a pattern and work piece on the table for rotation about a common axis, fluid operable means for rotating the pattern and work, additional fluid operable means for reciprocating said table whereby the pattern and work will be moved toward and from the tracer and cutter respectively along a radial path from said common axis, and means governed by the tracer for determining the proportionate rate of operation of the respective fluid operable means.

23. In a pattern controlled machine tool having a bed, a table reciprocably mounted upon the bed, means uprising from the bed at opposite sides of the table for supporting a tracer and a cutter in axial alignment, means to support a pattern and work piece on the table for rotation about a common axis, fluid operable means for rotating the pattern and work, additional fluid operable means for reciprocating said table whereby the pattern and work will be moved toward and from the tracer and cutter respectively along a radial path from said common axis, means governed by the tracer for determining the proportionate rate of operation of the respective fluid operable means, and means for feeding the cutter axially during rotary movement of the work.

24. In a pattern controlled machine tool having a bed, a table reciprocably mounted upon the bed, means uprising from the bed at opposite sides of the table for supporting a tracer and a cutter in axial alignment, means to support a pattern and work piece on the table for rotation about a common axis, fluid operable means for rotating the pattern and work, additional fluid operable means for reciprocating said table whereby the pattern and work will be moved toward and from the tracer and cutter respectively along a radial path from said common axis, means governed by the tracer for determining the proportionate rate of operation of the respective fluid operable means, and power operable means for feeding the cutter axially during rotation of the work.

25. In a pattern controlled machine tool having a bed, a table reciprocably mounted upon the bed, means uprising from the bed at opposite sides of the table for supporting a tracer and a cutter in axial alignment, means to support a pattern and work piece on the table for rotation about a common axis, fluid operable means for rotating the pattern and work, additional fluid operable means for reciprocating said table whereby the pattern and work will be moved toward and from the tracer and cutter respectively along a radial path from said common axis, means governed by the tracer for determining the proportionate rate of operation of the respective fluid operable means, power operable means for feeding the cutter axially during rotation of the work, and means for automatically disconnecting the power feeding means when the cutter has reached a predetermined path in the work.

26. In a milling machine having a tool supporting spindle and a work supporting spindle, the combination of fluid operable means for effecting axial movement of one of said spindles relative to the other, additional fluid operable means for rotating the work supporting spindle, and pattern controlled means for governing the ratio of rate of operation of the different fluid operable means whereby a helical groove will be formed in the work having a predetermined pitch.

BERNARD SASSEN.